US006174185B1

(12) United States Patent
Cecil, Jr.

(10) Patent No.: US 6,174,185 B1
(45) Date of Patent: Jan. 16, 2001

(54) PANEL MOUNTED CONNECTOR

(75) Inventor: Paul D. Cecil, Jr., Waukegan, IL (US)

(73) Assignee: Molex Incorporated, Lisle, IL (US)

( * ) Notice: Under 35 U.S.C. 154(b), the term of this patent shall be extended for 0 days.

(21) Appl. No.: 09/301,654

(22) Filed: Apr. 28, 1999

(51) Int. Cl.[7] .............................. H01R 13/64; H02B 1/01
(52) U.S. Cl. ............................................ 439/248; 439/560
(58) Field of Search .................................... 439/560, 561, 439/562, 563, 565, 567, 247, 248, 545, 474

(56) References Cited

U.S. PATENT DOCUMENTS 5,197,896 * 3/1993 Landis et al. ........................ 439/247
5,199,900 * 4/1993 Hayes, Sr. ............................ 439/557
5,391,086 * 2/1995 Woller et al. ........................ 439/157
5,788,522 * 8/1998 Kameyama ........................... 439/248
5,800,208 * 9/1998 Ishizuka et al. ..................... 439/557

* cited by examiner

*Primary Examiner*—Brian Sircus
*Assistant Examiner*—Chandrika Prasad
(74) *Attorney, Agent, or Firm*—Stacey E. Caldwell

(57) ABSTRACT

A connector is disclosed for mounting in an aperture in a panel. The connector is mateable with a complementary connecting device in a given mating direction. The connector includes a housing mountable in the aperture in the panel. The housing has a panel engagement member for restricting movement of the connector relative to the panel in the mating direction. A release component is operatively associated with the engagement member to release the engagement member and allow floating movement of the connector relative to the panel in the mating direction in response to a force greater than the given mating force.

14 Claims, 5 Drawing Sheets

PANEL MOUNTED CONNECTOR

FIELD OF THE INVENTION

This invention generally relates to the art of connector assemblies, such as electric connectors, fiber optic connectors and the like. More particularly, the invention relates to a system for restricting movement of a connector relative to a panel in a given mating direction and releasing the restrictions once a given mating force on the connector is exceeded.

BACKGROUND OF THE INVENTION

Electrical and other connector assemblies are used in a wide variety of applications wherein a connector is mounted through an aperture in a chassis such as a panel or the like. It often is desirable to mount the connector so that it has some degree of limited movement or "float" relative to the chassis or panel. For instance, in an automotive application, the chassis or panel and its mounted connector must be assembled in relation to another frame component or a printed circuit board, backplane or the like. By providing some degree of floating movement for the connector, accommodation is made for manufacturing tolerances when the entire system is assembled.

On the other hand, if a connector is mounted in a panel with floating movement relative thereto, it often is difficult to mate a complementary connector with the panel-mounted connector because the panel-mounted connector shifts around due to its floating movement. The present invention is directed to solving this problem by providing a unique system wherein a panel-mounted connector is restricted against movement relative to the panel in a mating direction, and the restriction is released in response to a force greater than a given mating force being exceeded.

SUMMARY OF THE INVENTION

An object, therefore, of the invention is to provide a new and improved connector for mounting through an aperture in a panel, the connector being mateable with a complementary connecting device with a given mating force in a given mating direction.

In the exemplary embodiment of the invention, the connector includes a housing mountable in the aperture in the panel. The housing includes engagement means for restricting movement of the connector relative to the panel in the mating direction. A release means is operatively associated with the engagement means to release the engagement means and allow movement of the connector relative to the panel in the mating direction in response to a force greater than the given mating force.

As disclosed herein, the engagement means is provided by an engaging member movable relative to the housing. The release means is provided by a frangible component joining the engaging member to the housing. The frangible component is breakable in response to a force greater than the given mating force. In the preferred embodiment, the housing is molded of plastic material and the frangible component is provided by an integrally molded, frangible web interconnected between the engaging member and the housing.

Still further, the engaging member is formed by a cantilevered flexible arm having an abutment portion at a free distal end of the arm. The frangible web is interconnected between the free end of the arm and the housing. Preferably, a plurality of the cantilevered flexible arms are provided generally at opposite sides of a mating portion of the housing.

Other objects, features and advantages of the invention will be apparent from the following detailed description taken in connection with the accompanying drawings.

BRIEF DESCRIPTION OF THE DRAWINGS

The features of this invention which are believed to be novel are set forth with particularity in the appended claims. The invention, together with its objects and the advantages thereof, may be best understood by reference to the following description taken in conjunction with the accompanying drawings, in which like reference numerals identify like elements in the figures and in which:

DETAILED DESCRIPTION OF THE PREFERRED EMBODIMENT

Figure 1:
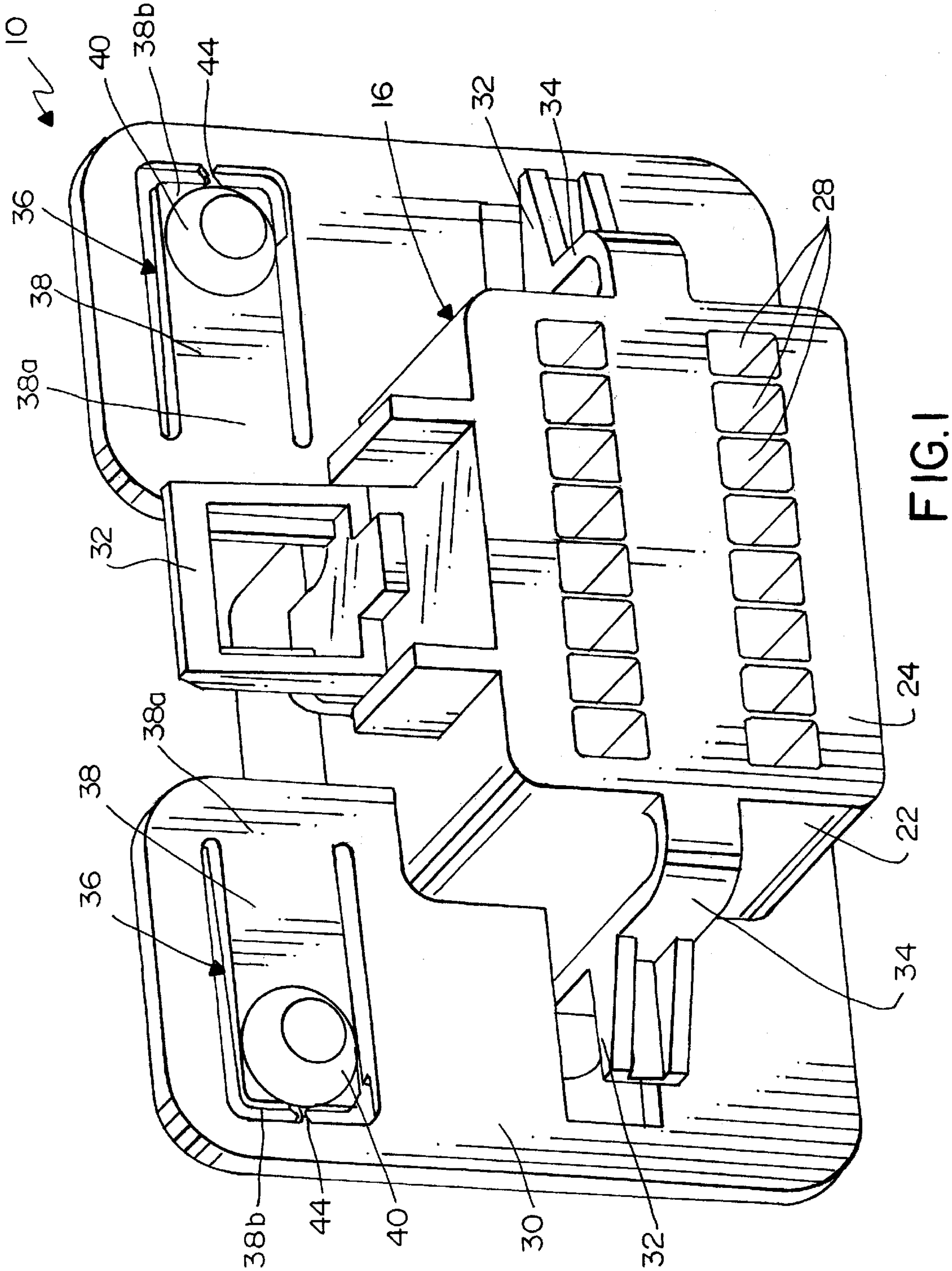
FIG. 1 is a perspective view of the terminating end of a panel mounted connector according to the invention.
Figure 2:
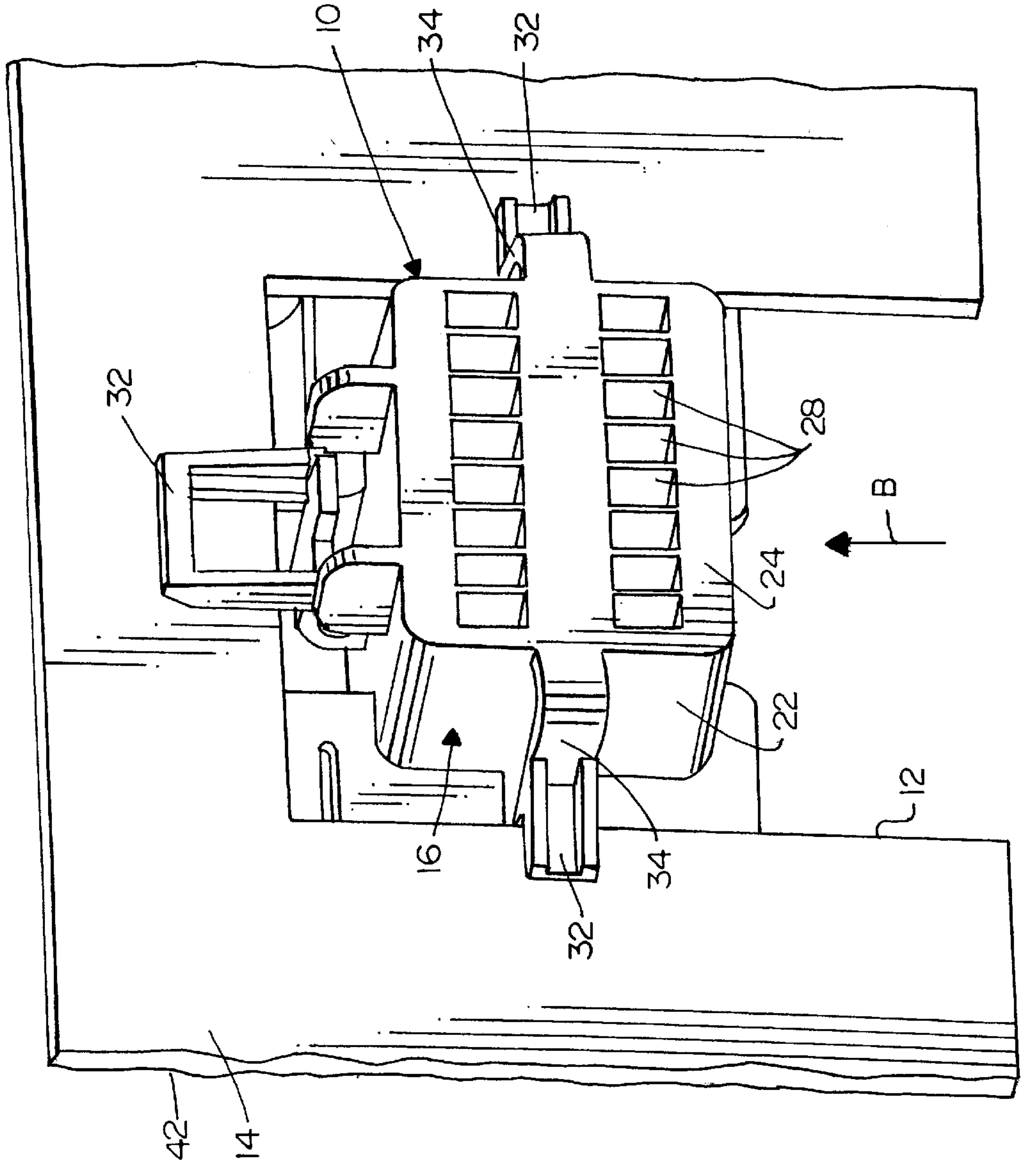
FIG. 2 is a perspective view of the connector mounted in an aperture in a panel.
Figure 3:
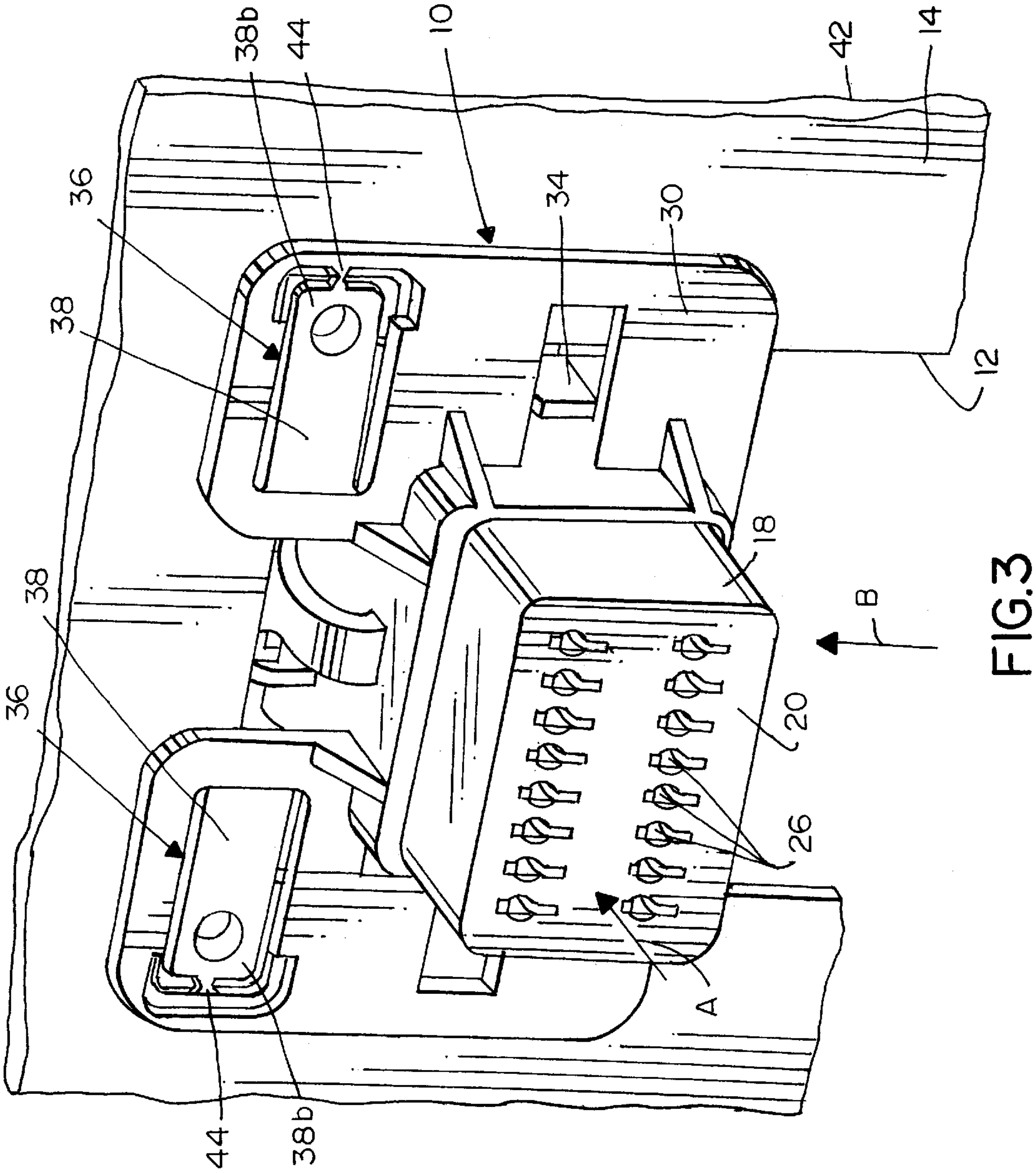
FIG. 3 is a view similar to that of FIG. 2, looking at the opposite side of the panel.

Referring to the drawings in greater detail, and first to FIGS. 1–3, the invention is embodied in a connector, generally designated 10, for mounting in an aperture or cutout 12 in a panel 14. The connector includes a one-piece unitarily molded plastic housing, generally designated 16. The housing includes a mating portion 18 defining a mating end 20, along with a terminating portion 22 defining a terminating end 24.

Mating portion 18 of connector 10 is insertable into a complementary mating connecting device or receptacle in a mating direction as indicated by arrow "A" (FIG. 3). The complementary connecting device will include terminals for insertion into appropriate terminal-receiving passages 26 (FIG. 3) for engagement with terminals within connector housing 16, the terminals not being visible in the drawings.

Terminating portion 22 of connector 10 includes a plurality of passages 28 (FIGS. 1 and 2) through which electrical wires are inserted. The conductors of the wires are terminated to the terminals in the housing. Typically, the wires are terminated to the terminals before inserting the terminals into passages 28 in the housing.

Unitarily molded housing 16 of connector 10 includes a main flange 30 and a plurality of stop flanges 32 which are spaced from the main flange to sandwich panel 14 therebetween as is clearly seen in FIGS. 2 and 3. The connector is inserted into cutout 12 in panel 14 in the direction of arrows "B". Stop flanges 32 project radially outwardly from flexible arms 34 which are engageable with the three sides of cutout 12 to allow for a given amount of relative movement or "floating" action between the connector and the panel in directions generally parallel to the panel.

Generally, the invention contemplates that engagement means, generally designated 36, be provided for restricting movement of connector 10 relative to panel 14 in mating direction "A". Specifically, a pair of flexible cantilevered engagement arms 38 are molded integrally with the housing, and each arm includes a proximal end 38*a* and a distal end 38*b*. As will be seen hereinafter, when the arms are released, the arms can flex or pivot about proximal ends 38*a*. Each arm includes an abutment boss 40 near distal end 38*b* of the arm for engaging an insertion side 42 of panel 14.

The invention contemplates the provision of a release means in the form of a frangible web 44 operatively associated with engagement means 36 to release the engagement means and allow movement of connector 10 relative to panel 14 in mating direction "A" in response to a force greater than the given mating force between the connector and the complementary mating connecting device. Specifically, frangible webs 44 comprise plastic webs integrally molded between main flange 30 of housing 16 and distal ends 38*b* of engagement arms 38. The webs can be sized to break in response to any given or predetermined force. Obviously, the larger the web the greater amount of force will be required to break the web.

It can be understood that the mating force between connector 10 and the complementary mating connecting device comprises a composite force equal to the forces required for mating all of the terminals within connector 10 to the terminals of the mating connecting device. This mating force can be easily calculated and would provide a "given mating force" of the connector assembly. In fact, some terminal manufacturers provide specifications on the mating forces required for specific mating terminals. Therefore, it can be understood that frangible webs 44 can be made of a size to break-away in response to a force somewhat greater than the given or calculated mating force.

As stated in the "Background", above, it is desirable to allow a pair of connectors to be mated before relative movement between the connectors and a panel is allowed. By providing frangible webs 44 to break only when the given mating force of the connector assembly is exceeded, connector 10 can be fully mated with the complementary connecting device while engagement arms and frangible webs 44 restrict movement of the connector relative to the panel in mating direction "A". However, when the given mating force is exceeded, frangible webs 44 will break and allow movement of connector 10 relative to panel 14 in the mating direction.

Figure 5:
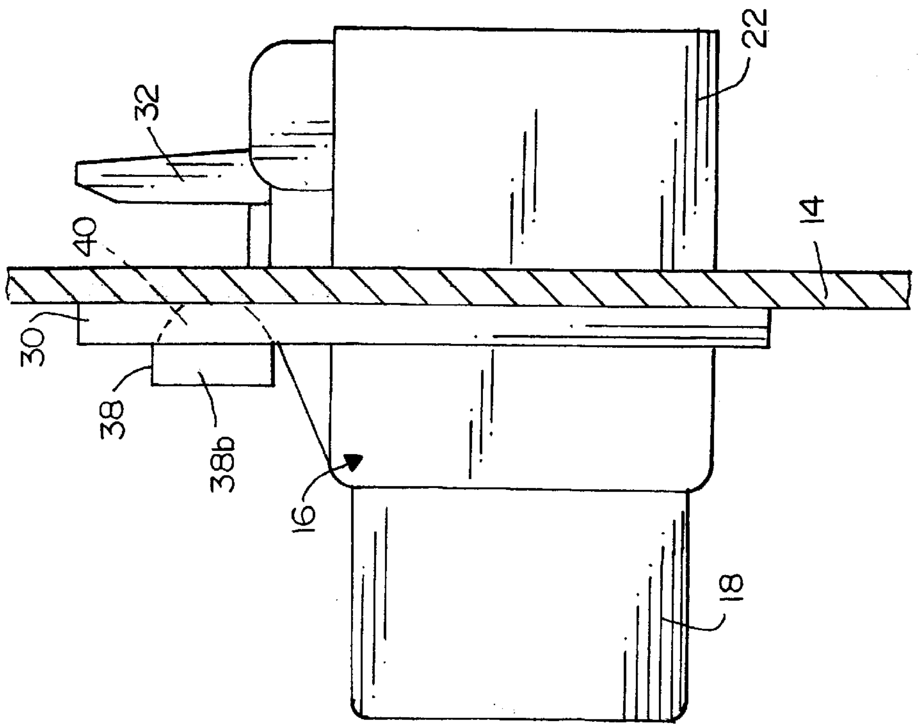
FIG. 5 is a view similar to that of FIG. 4, with the engagement means broken away from the connector housing.
Figure 4:
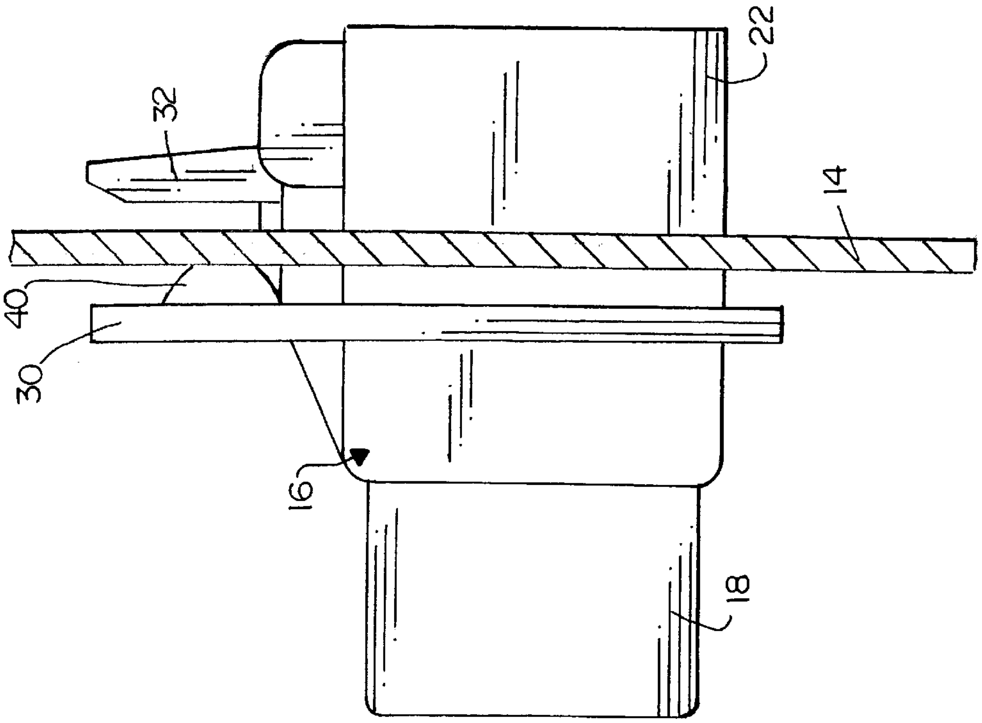
FIG. 4 is a side elevational view of the connector in the panel, with the engagement means abutting against the insertion side of the panel.
Figure 6:
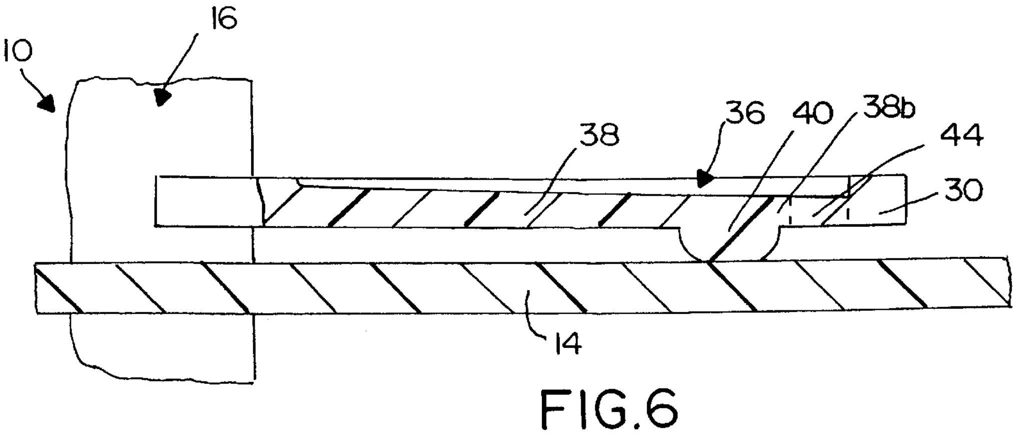
FIG. 6 is a fragmented section through the engagement arm corresponding to the position of FIG. 4.
Figure 7:
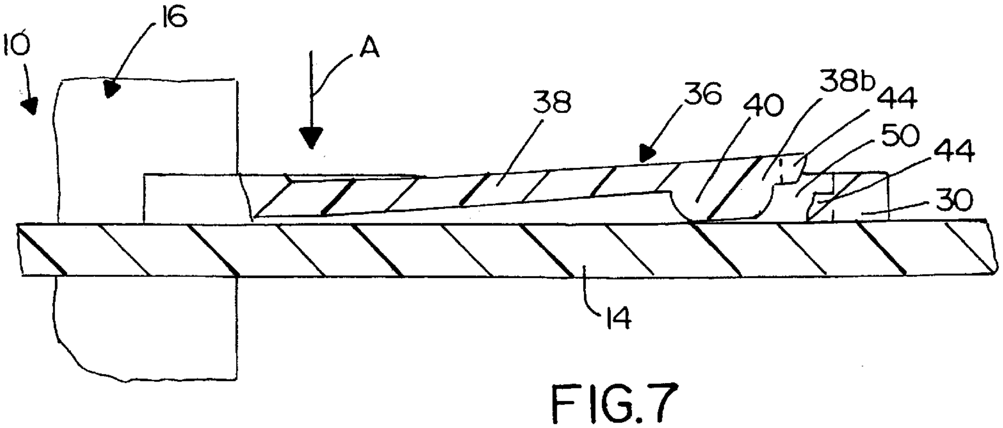
FIG. 7 is a fragmented section through the engagement arm corresponding to the position of FIG. 5.

FIGS. 4–7 show the break-away action of one of the engagement arms 38 of connector 10 relative to panel 14. More particularly, FIGS. 4 and 6 show the engagement arm with abutment boss 40 engaging the mating side 42 of panel 14. As seen in FIG. 6, frangible web 44 still joins distal end 38*b* of the engagement arm with main flange 30 of connector housing 16. FIGS. 5 and 7 show that the connector has been moved in mating direction "A" (FIG. 7) to an extent that frangible web 44 has been broken, as at 50. This condition would occur when the given mating force between connector 10 and the complementary mating connecting device has been exceeded and the break-away resistance of the frangible web also has been exceeded.

Figure 8:
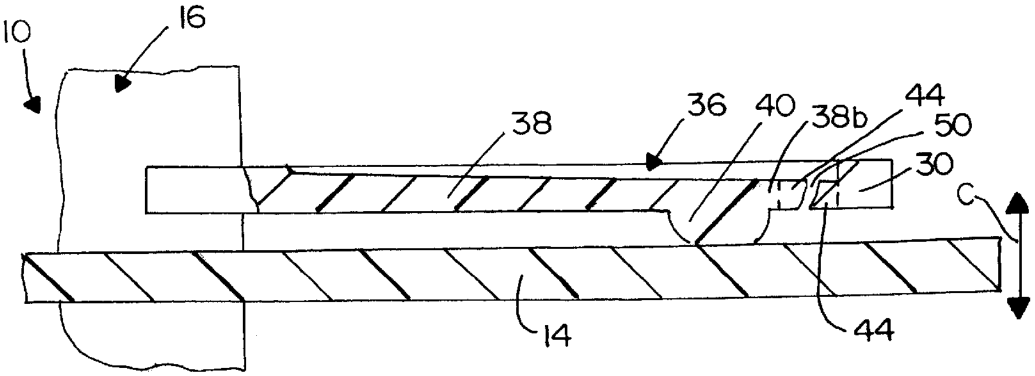
FIG. 8 is a view similar to that of FIGS. 6 and 7, but showing the engagement arm broken away from the housing but in its original unstressed condition.

FIG. 8 shows that engagement arm 38, being fabricated of plastic material, actually acts as a spring member to bias the connector to a sort of "neutral" position notwithstanding the fact that frangible web 44 has been broken. Therefore, after the given mating force has been exceeded to the extent of breaking frangible web 44, the resiliency in flexible cantilevered engagement arm 38 allows connector 10 to float relative to panel 14 in the direction of double-headed arrow "C" (FIG. 8).

It will be understood that the invention may be embodied in other specific forms without departing from the spirit or central characteristics thereof. The present examples and embodiments, therefore, are to be considered in all respects as illustrative and not restrictive, and the invention is not to be limited to the details given herein.

I claim:

1. A connector for mounting in an aperture in a panel, the connector being mateable with a complementary connecting device with a given mating force in a given mating direction, comprising:

a housing mountable in the aperture in the panel and including engagement means for restricting movement of the connector relative to the panel in said mating direction; and release means operatively associated with said engagement means to release the engagement means and allow movement of the connector relative to the panel in said mating direction in response to a force greater than said given mating force.

2. The connector of claim 1 wherein said engagement means is located for abutting the panel on an insertion side thereof.

3. The connector of claim 1 wherein said engagement means comprises a spring member.

4. The connector of claim 1 wherein said engagement means comprises an engaging member movable relative to the housing, and said release means comprises a frangible component joining the engaging member to the housing, the frangible component being breakable in response to a force greater than said given mating force.

5. The connector of claim 4 wherein said housing is molded of plastic material and said frangible component comprises an integrally molded, frangible web interconnected between the engaging member and the housing.

6. The connector of claim 1 wherein said engaging means comprises a engagement arm having a panel abutment portion.

7. The connector of claim 6 wherein said engagement arm is a cantilevered arm with said panel abutment portion at a free distal end of the arm.

8. The connector of claim 7 wherein said release means is operatively associated with the free end of the cantilevered arm.

9. The connector of claim 8, including a plurality of said cantilevered arms at opposite sides of the housing.

10. The connector of claim 9 wherein said housing includes a mating portion, and said arms are located generally at opposite sides of the mating portion.

11. A connector for mounting in an aperture in a panel, the connector being mateable with a complementary connecting device with a given mating force in a given mating direction, comprising:

a housing mountable in the aperture in the panel and including at least one cantilevered flexible engagement arm having a panel abutment portion at a free distal end of the arm for restricting movement of the connector relative to the panel in said mating direction; and a frangible component joining the engagement arm to the housing, the frangible component being breakable in response to a force greater than said given mating force.

12. The connector of claim 11 wherein said housing is molded of plastic material and said frangible component comprises an integrally molded, frangible web interconnected between the engaging arm and the housing.

13. The connector of claim 11, including a plurality of said cantilevered flexible arms at opposite sides of the housing.

14. The connector of claim 13 wherein said housing includes a mating portion, and said arms are located generally at opposite sides of the mating portion.

* * * * *